United States Patent
Becker et al.

(10) Patent No.: US 9,821,917 B2
(45) Date of Patent: Nov. 21, 2017

(54) AFT ENGINE FOR AN AIRCRAFT

(71) Applicant: General Electric Company, Schenectady, NY (US)

(72) Inventors: Thomas Lee Becker, Symmes Township, OH (US); Kurt David Murrow, Liberty Township, OH (US); Patrick Michael Marrinan, Mason, OH (US); Brandon Wayne Miller, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 126 days.

(21) Appl. No.: 14/859,514

(22) Filed: Sep. 21, 2015

(65) Prior Publication Data

US 2017/0081035 A1    Mar. 23, 2017

(51) Int. Cl.
| | |
|---|---|
| *B64D 27/14* | (2006.01) |
| *B64C 21/06* | (2006.01) |
| *B64D 29/00* | (2006.01) |
| *B64D 27/20* | (2006.01) |
| *B64D 29/04* | (2006.01) |
| *B64D 27/26* | (2006.01) |
| *B64D 33/02* | (2006.01) |

(52) U.S. Cl.
CPC .............. *B64D 27/14* (2013.01); *B64C 21/06* (2013.01); *B64D 27/20* (2013.01); *B64D 29/00* (2013.01); *B64D 29/04* (2013.01); *B64C 2230/00* (2013.01); *B64D 2027/264* (2013.01); *B64D 2033/0226* (2013.01)

(58) Field of Classification Search
CPC .................................................... B64D 27/14
See application file for complete search history.

(56) References Cited

U.S. PATENT DOCUMENTS

| 2,477,637 A | 8/1949 | Mercier |
|---|---|---|
| 2,812,912 A | 11/1957 | Stevens et al. |
| (Continued) | | |

FOREIGN PATENT DOCUMENTS

| EP | 0887259 A2 | 12/1998 |
|---|---|---|
| EP | 1616786 A1 | 1/2006 |
| (Continued) | | |

OTHER PUBLICATIONS

European Search Report and Opinion issued in connection with corresponding EP Application No. 16192467.5 dated Feb. 15, 2017.

(Continued)

*Primary Examiner* — Philip J Bonzell
*Assistant Examiner* — Michael Kreiner
(74) *Attorney, Agent, or Firm* — GE Global Patent Operation; William S. Munnerlyn (57) ABSTRACT

A propulsion system for an aircraft is provided having an aft engine configured to be mounted to the aircraft at an aft end of the aircraft. The aft engine includes a fan rotatable about a central axis of the aft engine having a plurality of fan blades. The aft engine also includes a nacelle encircling the plurality of fan blades with one or more structural members extending between the nacelle and the mean line of the aircraft at a location forward of the plurality of fan blades when the aft engine is mounted to the aircraft. The aft engine may increase a net thrust of the aircraft when mounted to the aircraft.

17 Claims, 9 Drawing Sheets

(56) References Cited

U.S. PATENT DOCUMENTS

| | | | |
|---|---|---|---|
| 2,918,229 A * | 12/1959 | Lippisch | B64C 39/062 244/15 |
| 3,194,516 A | 7/1965 | Messerschmitt | |
| 3,286,470 A | 11/1966 | Gerlaugh | |
| 3,289,975 A | 12/1966 | Hall | |
| 3,312,448 A | 4/1967 | Hull, Jr. et al. | |
| 3,844,110 A | 10/1974 | Widlansky et al. | |
| 4,089,493 A | 5/1978 | Paulson | |
| 4,371,133 A | 2/1983 | Edgley | |
| 4,605,185 A | 8/1986 | Reyes | |
| 4,722,357 A | 2/1988 | Wynosky | |
| 4,913,380 A | 4/1990 | Verdaman et al. | |
| 5,721,402 A | 2/1998 | Parente | |
| 5,927,644 A | 7/1999 | Ellis et al. | |
| 6,089,505 A | 7/2000 | Gruensfelder et al. | |
| 6,976,655 B2 | 12/2005 | Thompson | |
| 7,387,189 B2 | 6/2008 | James et al. | |
| 7,493,754 B2 | 2/2009 | Moniz et al. | |
| 7,665,689 B2 | 2/2010 | McComb | |
| 7,806,363 B2 | 10/2010 | Udall et al. | |
| 7,819,358 B2 | 10/2010 | Belleville | |
| 7,905,449 B2 | 3/2011 | Cazals et al. | |
| 7,976,273 B2 | 7/2011 | Suciu et al. | |
| 8,033,094 B2 | 10/2011 | Suciu et al. | |
| 8,099,944 B2 | 1/2012 | Foster et al. | |
| 8,109,073 B2 | 2/2012 | Foster et al. | |
| 8,162,254 B2 | 4/2012 | Roche | |
| 8,181,900 B2 | 5/2012 | Chene et al. | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,469,306 B2 | 6/2013 | Kuhn, Jr. | |
| 8,544,793 B1 | 10/2013 | Shammoh | |
| 8,549,833 B2 | 10/2013 | Hyde et al. | |
| 8,596,036 B2 | 12/2013 | Hyde et al. | |
| 8,640,439 B2 | 2/2014 | Hoffjann et al. | |
| 8,672,263 B2 | 3/2014 | Stolte | |
| 8,684,304 B2 | 4/2014 | Burns et al. | |
| 8,857,191 B2 | 10/2014 | Hyde et al. | |
| 8,890,343 B2 | 11/2014 | Bulin et al. | |
| 8,939,399 B2 | 1/2015 | Kouros et al. | |
| 8,998,580 B2 | 4/2015 | Quiroz-Hernandez | |
| 9,038,398 B2 | 5/2015 | Suciu et al. | |
| 2006/0011779 A1 | 1/2006 | Cazals et al. | |
| 2008/0023590 A1 | 1/2008 | Merrill et al. | |
| 2009/0127384 A1 | 5/2009 | Voorhees | |
| 2010/0038473 A1 | 2/2010 | Schneider et al. | |
| 2010/0294882 A1 | 11/2010 | Gantie et al. | |
| 2011/0215204 A1 | 9/2011 | Evulet | |
| 2012/0006935 A1 | 1/2012 | Bhargava | |
| 2012/0076635 A1 | 3/2012 | Atassi | |
| 2012/0119020 A1 | 5/2012 | Burns et al. | |
| 2012/0138736 A1 | 6/2012 | Cazals et al. | |
| 2012/0153076 A1 | 6/2012 | Burns et al. | |
| 2012/0209456 A1 | 8/2012 | Harmon et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0099065 A1 | 4/2013 | Stuhlberger | |
| 2013/0139515 A1 | 6/2013 | Schlak | |
| 2013/0184958 A1 | 7/2013 | Dyrla et al. | |
| 2013/0199624 A1 | 8/2013 | Smith et al. | |
| 2013/0227950 A1 | 9/2013 | Anderson et al. | |
| 2013/0251525 A1 | 9/2013 | Saiz | |
| 2013/0284279 A1 | 10/2013 | Richards | |
| 2013/0336781 A1 | 12/2013 | Rolt et al. | |
| 2014/0010652 A1 | 1/2014 | Suntharalingam et al. | |
| 2014/0060995 A1 | 3/2014 | Anderson et al. | |
| 2014/0151495 A1 | 6/2014 | Kuhn, Jr. | |
| 2014/0179535 A1 | 6/2014 | Stuckl et al. | |
| 2014/0212279 A1 | 7/2014 | Boudebiza et al. | |
| 2014/0250861 A1 | 9/2014 | Eames | |
| 2014/0283519 A1 | 9/2014 | Mariotto et al. | |
| 2014/0290208 A1 | 10/2014 | Rechain et al. | |
| 2014/0339371 A1 | 11/2014 | Yates et al. | |
| 2014/0345281 A1 | 11/2014 | Galbraith | |
| 2014/0346283 A1 | 11/2014 | Salyer | |
| 2014/0367510 A1 | 12/2014 | Viala et al. | |
| 2014/0367525 A1 | 12/2014 | Salyer | |
| 2014/0369810 A1 | 12/2014 | Binks et al. | |
| 2015/0013306 A1 | 1/2015 | Shelley | |
| 2015/0028594 A1 | 1/2015 | Mariotto | |
| 2015/0285144 A1 | 10/2015 | Todorovic et al. | |
| 2015/0291285 A1 * | 10/2015 | Gallet | F01D 13/02 415/60 |

FOREIGN PATENT DOCUMENTS

| | | |
|---|---|---|
| EP | 2730501 A2 | 5/2014 |
| EP | 3048042 A1 | 7/2016 |
| EP | 3093235 A1 | 11/2016 |
| FR | 1181456 A | 6/1959 |
| FR | 2993859 A1 | 1/2014 |
| GB | 406713 A | 2/1934 |
| GB | 2489311 A | 9/2012 |
| WO | WO 2010/020199 A1 | 2/2010 |
| WO | 2010103252 A1 | 9/2010 |
| WO | WO 2014/072615 A1 | 5/2014 |

OTHER PUBLICATIONS http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

European Search Report and Opinion issued in connection with corresponding EP Application No. 16188786.4 dated Nov. 16, 2016.

"Concept Study Propulsive Fuselage: Adding an Extra Engine to Reduce Emissions", Bauhaus Luftfahrt, 02 Pages, May 20, 2014.

Notice of Allowance issued in connection with Related U.S. Appl. No. 14/859,549 dated Jan. 5, 2017.

U.S. Non-Final Office Action issued in connection with Related U.S. Appl. No. 14/859,566 dated Feb. 1, 2017.

Boeing 737, "https://en.wikipedia.org/wiki/Boeing_737", Retrieved on Feb. 4, 2017.

U.S. Non-Final Office Action issued in connection with Related U.S. Appl. No. 14/859,523 dated Feb. 9, 2017.

U.S. Non-Final Office Action issued in connection with Related U.S. Appl. No. 14/859,556 dated Feb. 9, 2017.

European Search Report and Opinion issued in connection with Related EP Application No. 16188826.8 dated Feb. 15, 2017.

European Search Report and Opinion issued in connection with Related EP Application No. 16188994.4 dated Feb. 17, 2017.

European Search Report and Opinion issued in connection with Related EP Application No. 16188464.8 dated Feb. 17, 2017.

Final Office Action issued in connection with Related U.S. Appl. No. 14/859,566 dated May 11, 2017.

GE Related Case Form.

US Notice of Allowance issued in connection with related U.S. Appl. No. 14/859,566 on Jul. 14, 2017.

* cited by examiner

AFT ENGINE FOR AN AIRCRAFT

FIELD OF THE INVENTION

The present subject matter relates generally to an aircraft propulsion system including an aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of reduced drag on the aircraft.

Accordingly, a propulsion system including one or more components for reducing an amount of drag on the aircraft would be useful. More particularly, a propulsion system including one or more components for reducing an amount of drag on the aircraft without causing any substantial decreases in an efficiency of the aircraft engines would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system for an aircraft having a fuselage is provided. The propulsion system includes an aft engine configured to be mounted to the aircraft at an aft end of the aircraft. The aft engine defines a central axis and includes a fan rotatable about the central axis, the fan having a plurality of fan blades. The aft engine also includes a nacelle encircling the fan and extending around the mean line of the aircraft at the aft end of the aircraft when the aft engine is mounted to the aircraft. The aft engine also includes one or more structural members extending between the nacelle and the fuselage of the aircraft at a location forward of the plurality of fan blades when the aft engine is mounted to the aircraft.

In another exemplary embodiment of the present disclosure, a boundary layer ingestion fan for mounting to an aircraft at an aft end of the aircraft is provided. The boundary layer ingestion fan includes a fan rotatable about a central axis of the boundary layer ingestion fan and including a plurality of fan blades. The boundary layer ingestion fan also includes a nacelle encircling the plurality of fan blades of the fan. The nacelle also defines an inlet with the fuselage of the aircraft and extends substantially around the fuselage of the aircraft when the boundary layer ingestion fan is mounted at the aft end of the aircraft. The boundary layer ingestion fan also includes one or more structural members attached to the nacelle at a location forward of the plurality of fan blades of the fan for mounting the boundary layer ingestion fan to the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
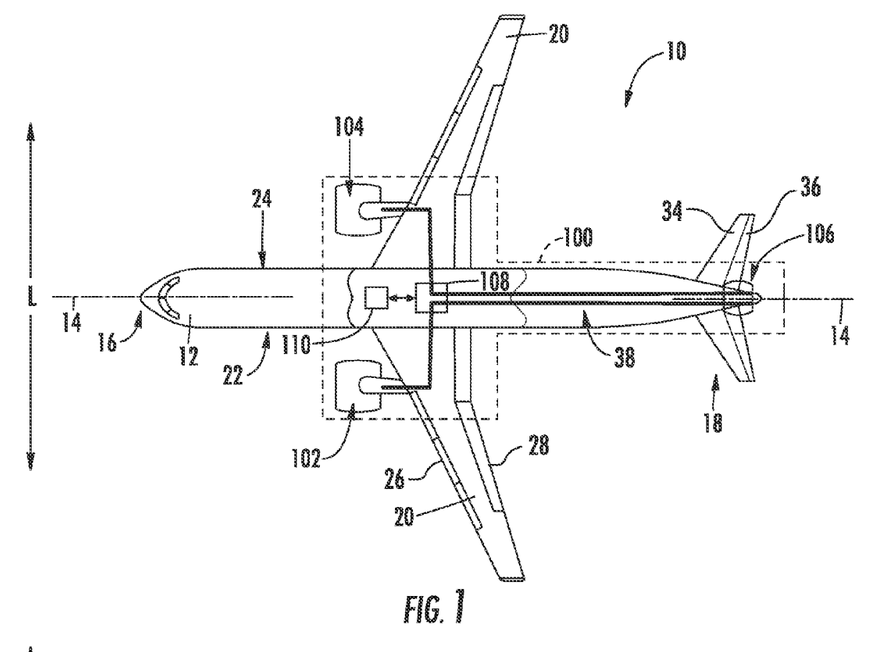
FIG. 1 is a top view of an aircraft according to various exemplary embodiments of the present disclosure.
Figure 2:
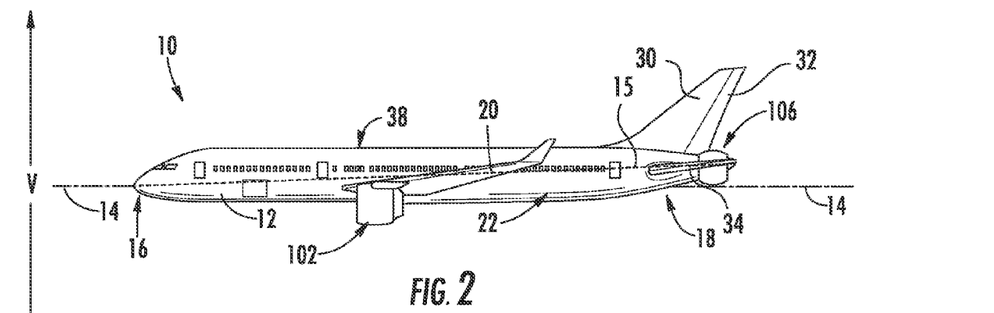
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes a pair of aircraft engines, at least one of which mounted to each of the pair of wings 20, and an aft engine. For the embodiment depicted, the aircraft engines are configured as turbofan jet engines 102, 104 suspended beneath the wings 20 in an under-wing configuration. Additionally, the aft engine is configured as an engine configured to ingest and consume air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. The BLI fan 106 is mounted to the aircraft 10 at a location aft of the wings 20 and/or the jet engines 102, 104, such that the mean line 15 extends therethrough. Specifically, for the embodiment depicted, the BLI fan 106 is fixedly connected to the fuselage 12 at the aft end 18, such that the BLI fan 106 is incorporated into or blended with a tail section at the aft end 18. However, it should be appreciated that in various other embodiments, some of which will be discussed below, the BLI fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or both of the energy storage device 110 or the BLI fan 106. Accordingly, in such an embodiment, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
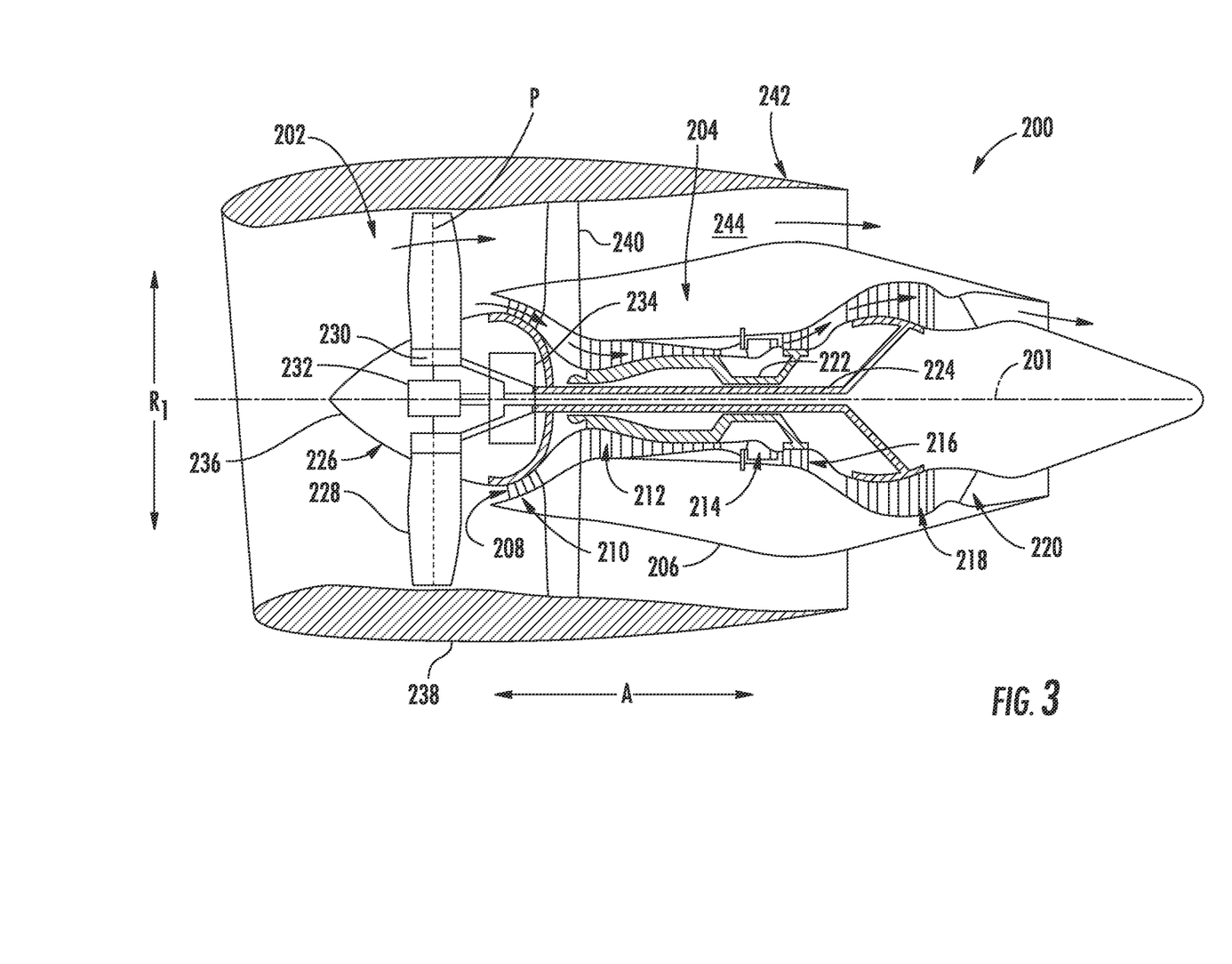
FIG. 3 is a schematic, cross-sectional view of a gas turbine engine mounted to the exemplary aircraft of FIG. 1.

Referring now to FIG. 3, in at least certain embodiments, the jet engines 102, 104 may be configured as high-bypass turbofan jet engines. FIG. 3 is a schematic cross-sectional view of an exemplary high-bypass turbofan jet engine 200, herein referred to as "turbofan 200." In various embodiments, the turbofan 200 may be representative of jet engines 102, 104. As shown in FIG. 3, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction $R_1$. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

It should be appreciated, however, that the exemplary turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine.

Figure 4:
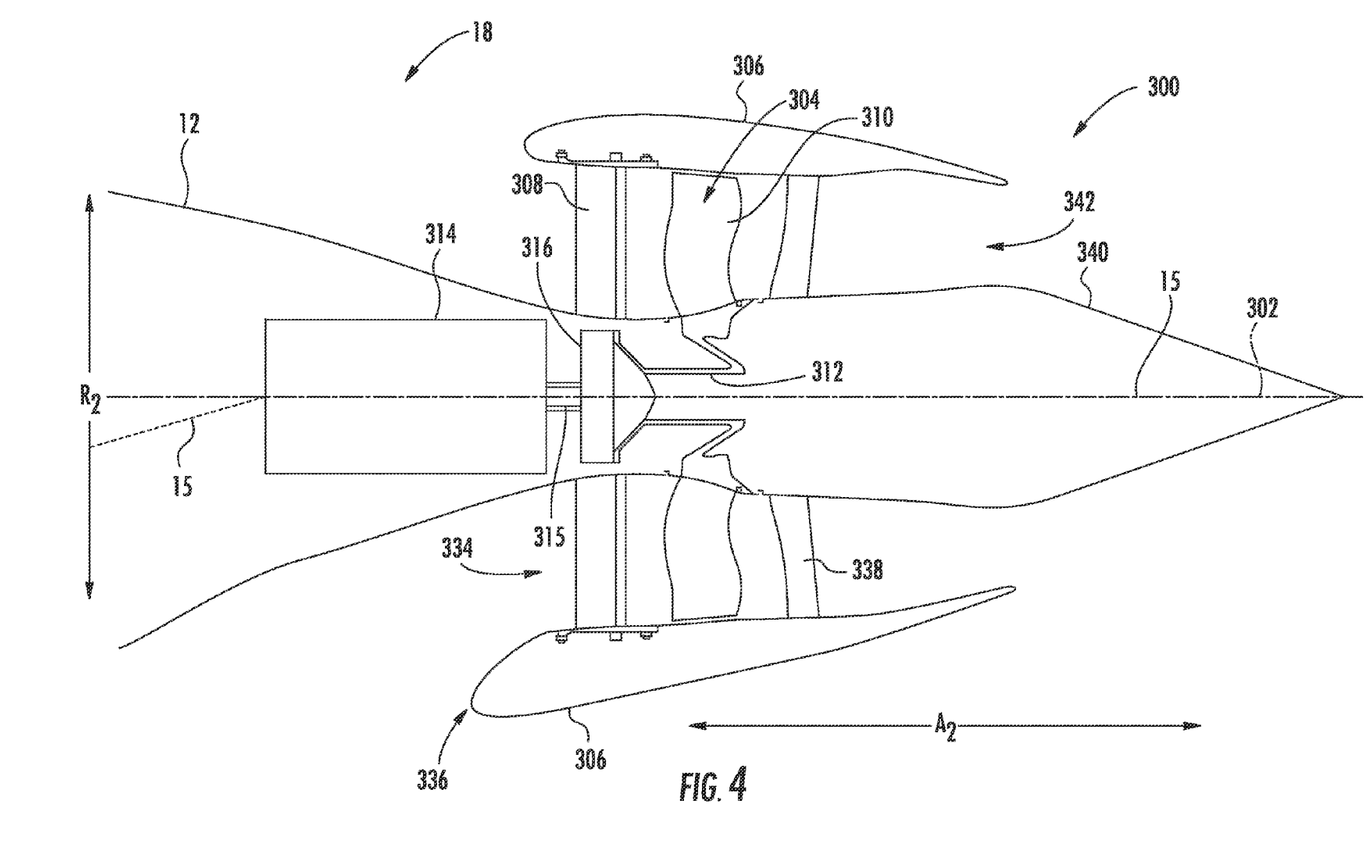
FIG. 4 is a schematic, cross-sectional view of an aft engine in accordance with an exemplary embodiment of the present disclosure.

Referring now to FIG. 4, a schematic, cross-sectional side view of an aft engine in accordance with various embodiments of the present disclosure is provided, the aft engine mounted to an aircraft 10 at a tail section 18 of the aircraft 10. Specifically, for the embodiment depicted, the aft engine is configured as a boundary layer ingestion (BLI) fan 300. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

As shown in FIG. 4, the BLI fan 300 defines an axial direction $A_2$ extending along a longitudinal centerline axis 302 that extends therethrough for reference. Additionally, the BLI fan 300 defines a radial direction $R_2$ and a circumferential direction $C_2$ (see FIG. 6).

In general, the BLI fan 300 includes a fan 304 rotatable about the centerline axis 302, a nacelle 306 extending around a portion of the fan 304, and one or more structural members 308 extending between the nacelle 306 and the fuselage 12 of the aircraft 10. More specifically, the fan 304 includes a plurality of fan blades 310 spaced generally along the circumferential direction $C_2$, and the one or more structural members 308 extend between the nacelle 306 and the fuselage 12 of the aircraft 10 at a location forward of the plurality of fan blades 310. Further, the nacelle 306 extends around and encircles the plurality of fan blades 310, and also extends around the fuselage 12 of the aircraft 10 and the mean line 15 of the aircraft 10 at an aft end 18 of the aircraft 10 when, as in FIG. 4, the BLI fan 300 is mounted to the aircraft 10. Notably, as used herein, the term "nacelle" includes the nacelle as well as any structural fan casing.

As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain exemplary embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an exemplary embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. For the embodiment depicted, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain exemplary embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. However, in other exemplary embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain exemplary embodiments, the power source 314 may be configured as a gas turbine engine positioned at least partially within the BLI fan 300.

As briefly stated above, the BLI fan 300 includes one or more structural members 308 for mounting the BLI fan 300 to the aircraft 10. The one or more structural members 308 for the embodiment depicted extend substantially along the radial direction $R_2$ of the BLI fan 300 between the nacelle 306 and the fuselage 12 of the aircraft 10 for mounting the BLI fan 300 to the fuselage 12 of the aircraft 10. It should be appreciated, that as used herein, terms of approximation, such as "approximately," "substantially," or "about," refer to being within a ten percent margin of error.

Additionally, for the embodiment depicted, the one or more structural members 308 are configured as inlet guide vanes for the fan 304. Specifically, the one or more structural members 308 are shaped and oriented to direct and condition a flow of air into the BLI fan 300 to, e.g., increase an efficiency of the BLI fan 300, or reduce a distortion of the air flowing into the BLI fan 300.

Figure 5:
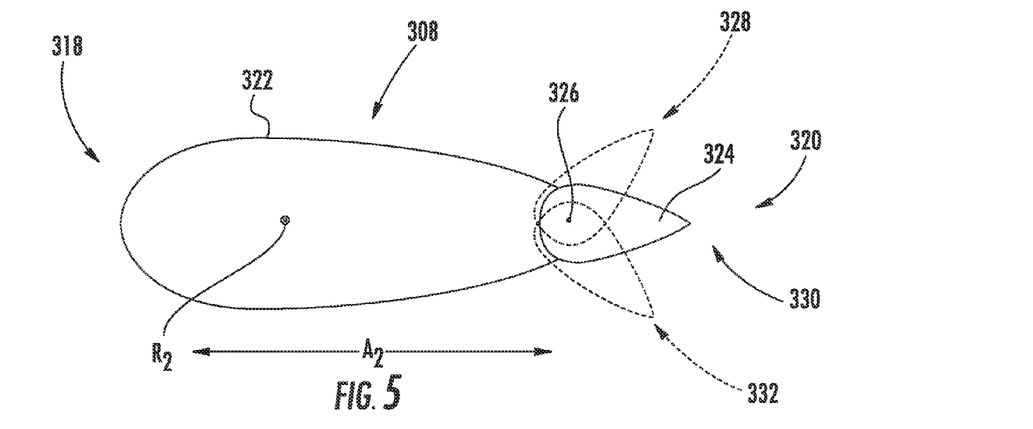
FIG. 5 is a cross-sectional view of a structural member of the exemplary aft engine of FIG. 4 in accordance with an exemplary embodiment of the present disclosure.

In certain exemplary embodiments, the one or more structural members 308 may be configured as fixed inlet guide vanes extending between the nacelle 306 and the fuselage 12 of the aircraft 10. However, for the embodiment depicted, the one or more structural members 308 are configured as variable inlet guide vanes. Referring now also to FIG. 5, a cross-sectional view is provided of one of the exemplary structural members 308 depicted in FIG. 4, taken along the radial direction $R_2$. As shown, the structural member 308 extends between a forward, upstream end 318 and an aft, downstream end 320. A body 322 of the structural member 308 depicted is fixed relative to the nacelle 306 of the BLI fan 300 and the fuselage 12 of the aircraft 10. However, the structural member 308 additionally includes a flap 324 at the aft end 320 configured to rotate about a substantially radial axis 326. Specifically, as shown, the flap 324 is configured to rotate between a first position 328 (in phantom), a neutral position 330, a second position 332 (in phantom), and a potentially infinite number of positions therebetween. By rotating the flap 324 between the various positions, the structural member 308 may be configured to vary a direction in which air flowing thereover is directed.

Figure 6:
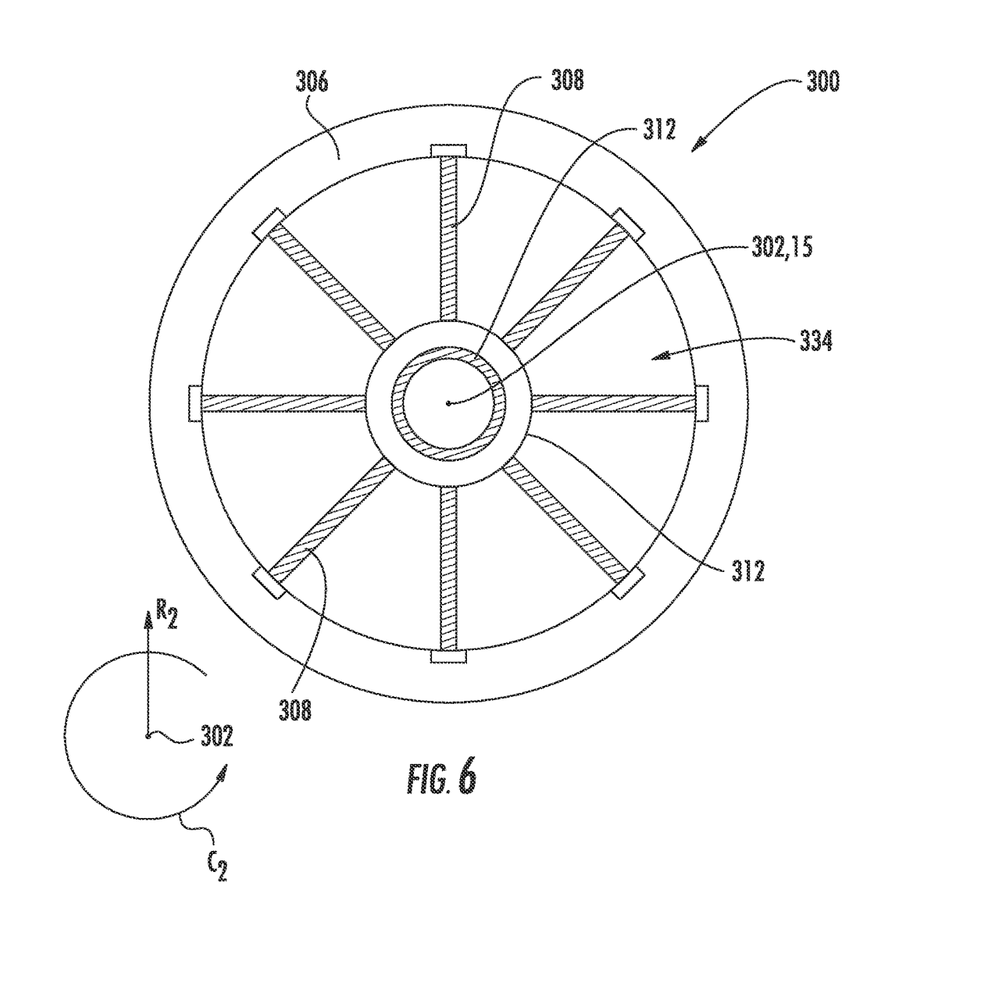
FIG. 6 is a schematic, cross-sectional view of the exemplary aft engine of FIG. 4, viewed along an axial centerline of the exemplary aft engine of FIG. 4.

Referring still to FIG. 4, and now also to FIG. 6, the BLI fan 300 defines an inlet 334 at a forward end 336 between the nacelle 306 and the fuselage 12 of the aircraft 10. As mentioned above, the nacelle 306 of the BLI fan 300 extends around the mean line 15 of the aircraft 10 and the fuselage 12 of the aircraft 10 at the aft end of the aircraft 10. Accordingly, for the embodiment depicted, the inlet 334 of the BLI fan 300 extends substantially three hundred sixty degrees (360°) around the mean line 15 of the aircraft 10 and the fuselage 12 of the aircraft 10 when, such as in the embodiment depicted, the BLI fan 300 is mounted to the aircraft 10. Notably, as may also be seen in FIG. 6, the one or more structural members 308 for the embodiment depicted are evenly spaced along the circumferential direction $C_2$ of the BLI fan 300. For the embodiment depicted, the BLI fan 300 includes eight structural members 308 spaced along the circumferential direction $C_2$ of the BLI fan 300, each extending between the nacelle 306 and the fuselage 12 of the aircraft 10 generally along the radial direction $R_2$. However, in other exemplary embodiments, any other suitable number of structural members 308 may be provided extending between the nacelle 306 and the fuselage 12 of the aircraft 10. Additionally, in still other exemplary embodiments, the BLI fan 300, or rather the nacelle 306, may have any other suitable cross-sectional shape along the axial direction $A_2$ (as opposed to the circular shape depicted) and the structural members 308 may not be evenly spaced along the circumferential direction $C_2$.

Referring still to FIG. 4, the BLI fan 300 additionally includes one or more outlet guide vanes 338 and a tail cone 340. The one or more outlet guide vanes 338 for the embodiment depicted extend between the nacelle 306 and the tail cone 340 for directing a flow of air through the BLI fan 300, and optionally for adding strength and rigidity to the BLI fan 300. The outlet guide vanes 338 may be evenly spaced along the circumferential direction $C_2$ (similar to the inlet guide vanes/structural members 308 depicted in FIG. 6), or may have any other suitable spacing. Additionally, the outlet guide vanes 338 may be fixed outlet guide vanes, or alternatively may be variable outlet guide vanes. Inclusion of the plurality of outlet guide vanes 338 extending between the nacelle 306 and the tail cone 340 may allow for, e.g., tighter clearances between the plurality of fan blades 310 and the nacelle 306, such that an efficiency of the BLI fan 300 may be maximized.

Aft of the plurality of fan blades 310, and for the embodiment depicted, aft of the one or more outlet guide vanes 338, the BLI fan 300 additionally defines a nozzle 342 between the nacelle 306 and the tail cone 340. The nozzle 342 may be configured to generate an amount of trust from the air flowing therethrough, and the tail cone 340 may be shaped to minimize an amount of drag on the BLI fan 300. However, in other embodiments, the tail cone 340 may have any other shape and may, e.g., end forward of an aft end of the nacelle 306 such that the tail cone 340 is enclosed by the nacelle 306 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring now to FIGS. 7 through 10, various alternative embodiments of the exemplary BLI fan 300 depicted in FIG. 4 are provided. Each of the various embodiments depicted in FIGS. 7 through 10 may be configured in substantially the same manner as the exemplary BLI fan 300 depicted in FIG. 4 (except for the differences described herein), and thus the same or similar numbers throughout these figures refers to the same or similar components.

Figure 7:
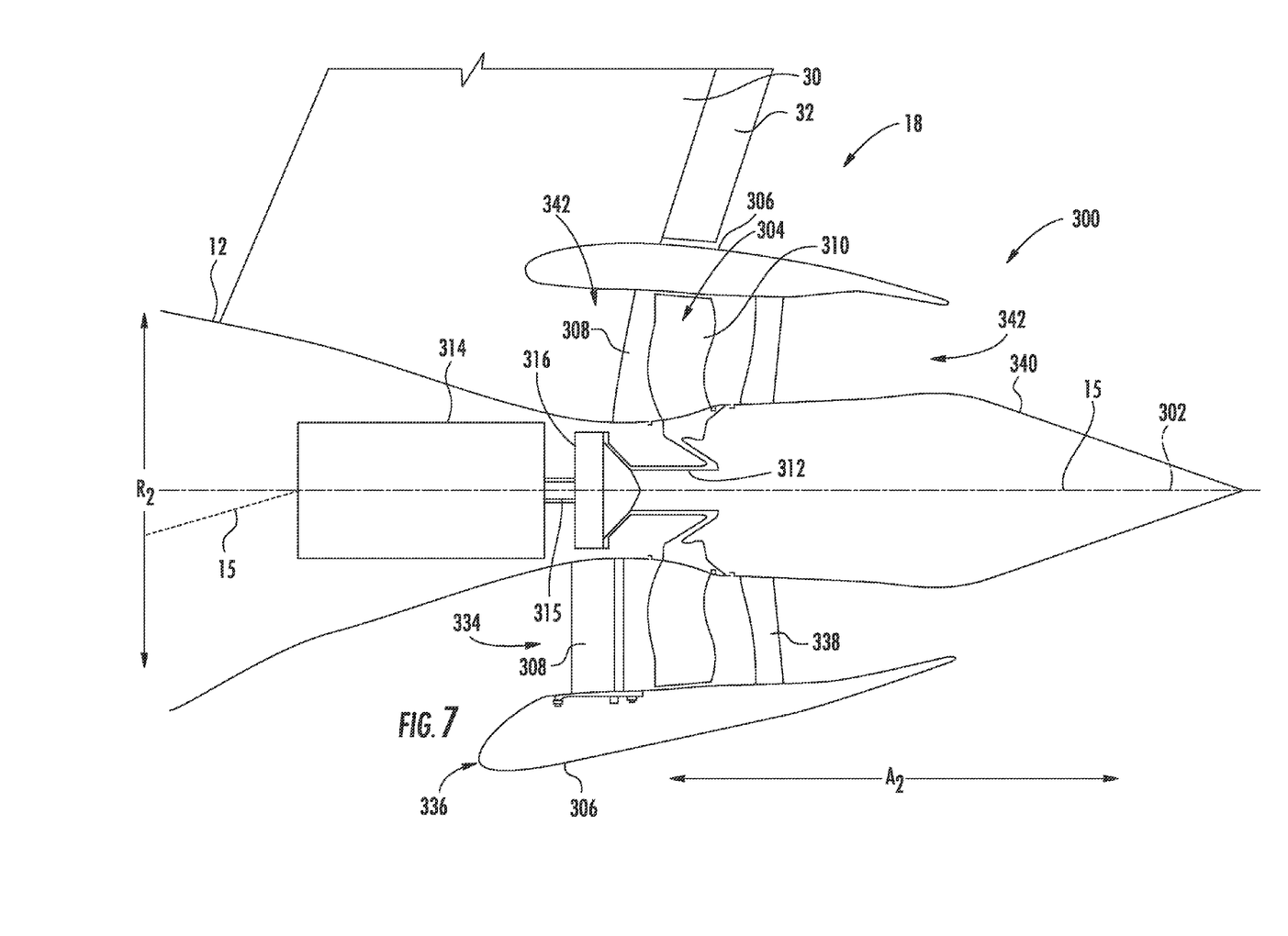
FIG. 7 is a schematic, cross-sectional view of an aft engine in accordance with another exemplary embodiment of the present disclosure.
Figure 8:
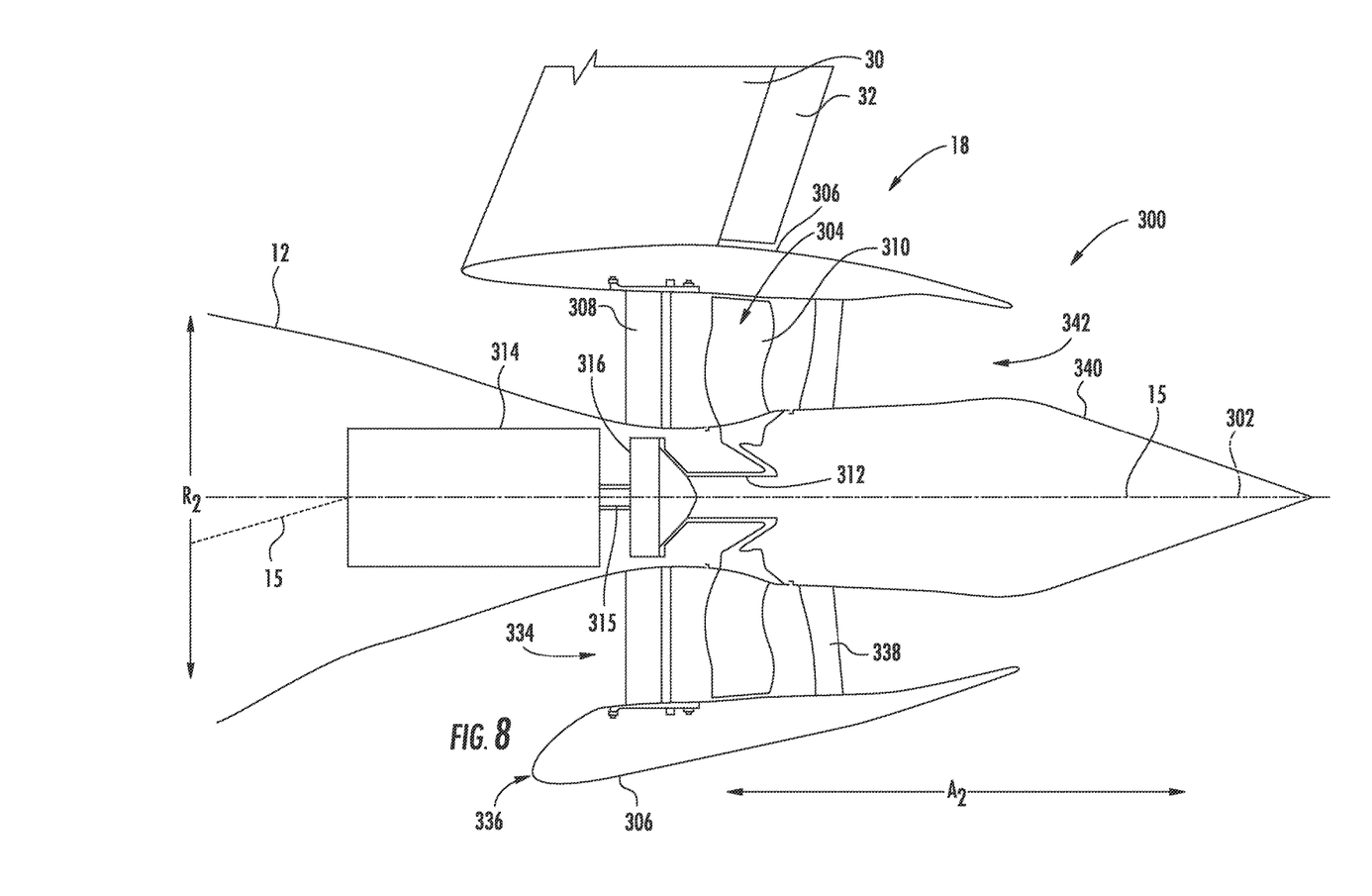
FIG. 8 is a schematic, cross-sectional view of an aft engine in accordance with yet another exemplary embodiment of the present disclosure.

Referring specifically to FIG. 7, an exemplary BLI fan 300 is mounted to a fuselage 12 of an aircraft 10 at an aft end of the aircraft 10 and integrated into a tail section 18 of the aircraft 10. Specifically, for the embodiment of FIG. 7 at least a portion 342 of a vertical stabilizer 30 the aircraft 10 extends from the fuselage 12 of aircraft 10 to and through the nacelle 306 of the BLI fan 300. More specifically, for the embodiment depicted, the vertical stabilizer 30 of the aircraft 10 acts as one of the one or more structural members 308 of the BLI fan 300, such that the one or more structural members 308 of the BLI fan 300 may be considered as including the portion 342 of the vertical stabilizer 30 of the aircraft 10. Although not depicted, in certain exemplary embodiments, the one or more structural members 308 of the BLI fan 300 may additionally, or alternatively, include at least a portion of one or more horizontal stabilizers of the aircraft 10 (such as the horizontal stabilizers 34 depicted in FIGS. 1 and 2). Notably, for the embodiment depicted, a flap 32 of the vertical stabilizer 30 is located outward from the BLI fan 300.

Similarly, referring now to the exemplary BLI fan 300 of FIG. 8, the BLI fan 300 is again mounted to a fuselage 12 of an aircraft 10 and integrated into a tail section 18 of the aircraft 10. Specifically for the embodiment of FIG. 8, the BLI fan 300 is mounted where the vertical stabilizer 30 otherwise would be positioned, and the vertical stabilizer 30 is instead mounted directly to a nacelle 306 of the BLI fan 300. With such a configuration, the one or more structural members 308 of the BLI fan 300 and one or more outlet guide vanes 338 may be sized to withstand an anticipated load on the nacelle 306 generated by the vertical stabilizer 30. Although not depicted, in certain exemplary embodiments, the nacelle 306 of the BLI fan 300 may additionally, or alternatively, include one or more horizontal stabilizers 34 of the aircraft 10 attached thereto.

Figure 9:
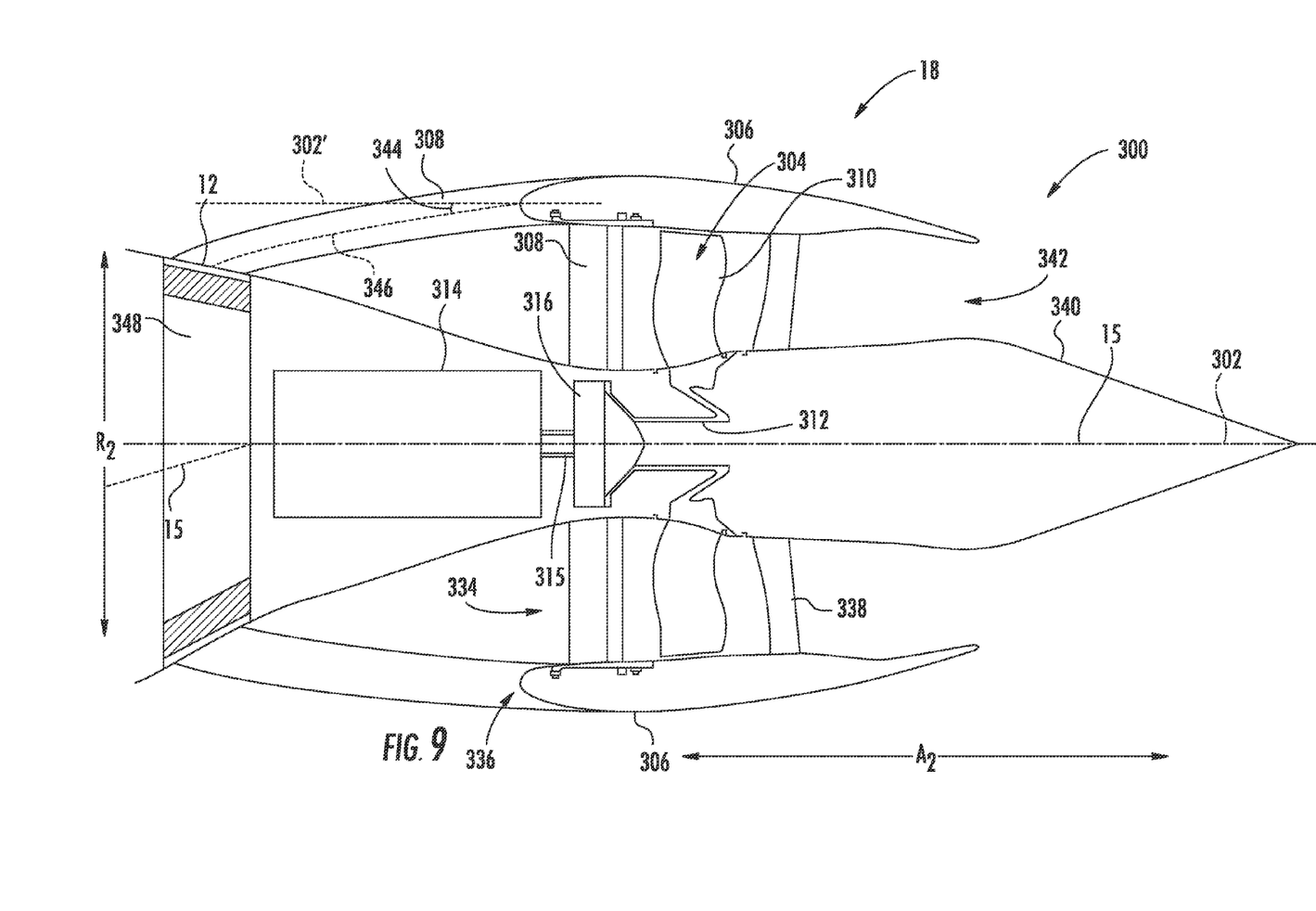
FIG. 9 is a schematic, cross-sectional view of an aft engine in accordance with still another exemplary embodiment of the present disclosure.

Referring now to FIG. 9, an exemplary BLI fan 300 is depicted attached to a fuselage 12 of an aircraft 10 in an alternative manner. More particularly, for the exemplary embodiment of FIG. 9, the BLI fan 300 includes one or more structural members 308, the one or more structural members 308 configured axially. Specifically, for the embodiment depicted, the one or more structural members 308 do not extend exactly along a radial direction $R_2$ of the BLI fan 300, and instead define an acute angle 344 with the axial direction $A_2$, or centerline axis 302 of the BLI fan 300 (note that line 302' is provided in phantom for reference, extending parallel to the centerline axis 302). For example, for the embodiment depicted, the one or more structural members 308 define an angle 344 with the axial direction $A_2$ of the BLI fan 300 of less than about thirty degrees (30°). It should be appreciated, however, that in other exemplary embodiments, the one or more structural members 308 instead define an angle 344 with the axial direction of less than about twenty degrees (20°), less than about fifteen degrees (15°), or less than about ten degrees (10°). As contemplated herein, the angle 344 between the one or more structural members 308 and the axial direction $A_2$ refers to an angle defined between a centerline or mean/camber line 346 (in phantom) of the one or more structural members 308 and the axial direction $A_2$. In still other embodiments, however, the one or more structural members 308 and the axial direction $A_2$ may instead define any other suitable angle, such as any suitable angle between about zero degrees and about ninety degrees (see, e.g., FIG. 4).

As is depicted, for the embodiment of FIG. 9, the one or more structural members 308 extend from the nacelle 306 of the BLI fan 300 to the fuselage 12 of the aircraft 10, and attach to certain structural members 348 within the fuselage 12 of the aircraft 10. Such a configuration may allow the axially oriented structural members 308 to support an anticipated amount of force on the nacelle 306 of the BLI fan 300.

Figure 10:
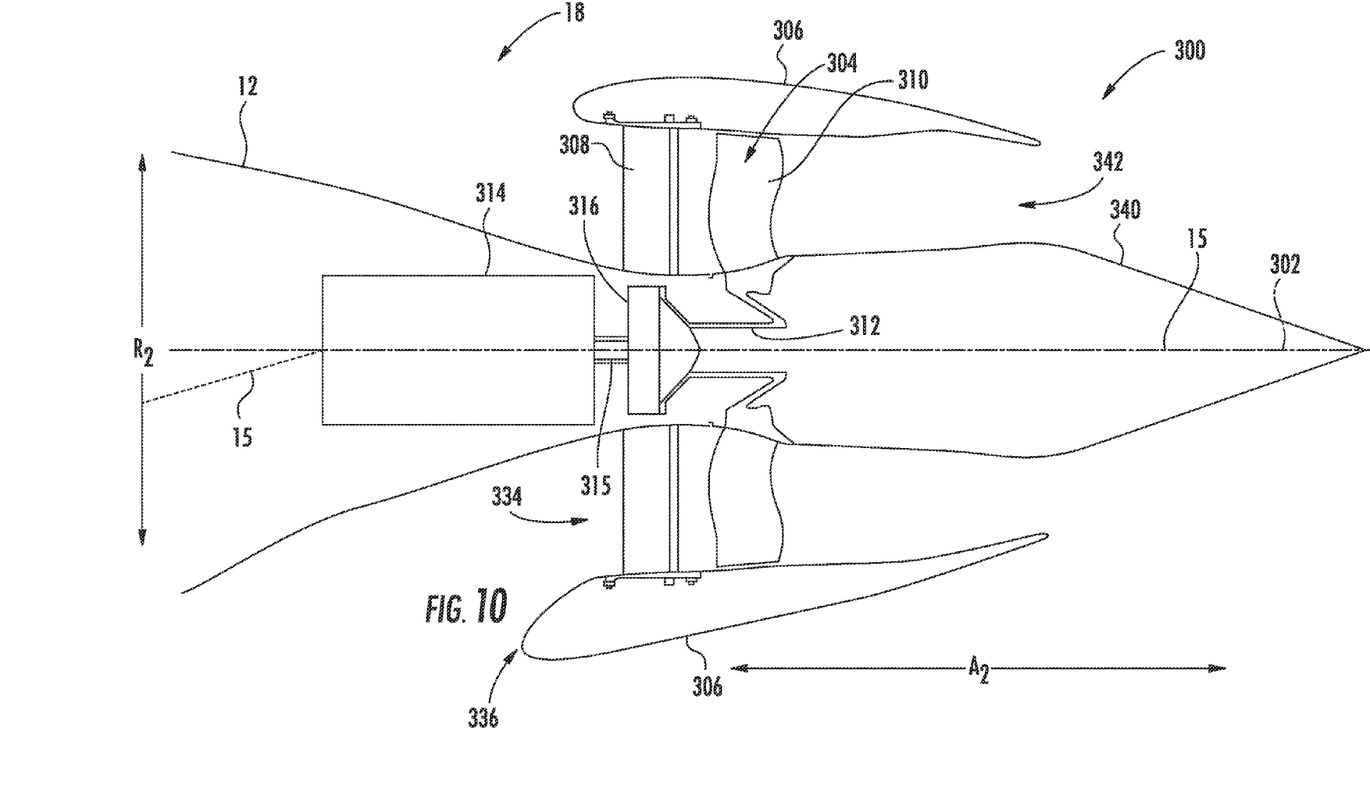
FIG. 10 is a schematic, cross-sectional view of an aft engine in accordance with yet another exemplary embodiment of the present disclosure.

Referring now to FIG. 10, another exemplary BLI fan 300 is depicted. For the embodiment depicted, the BLI fan 300 is configured without any outlet guide vanes (such as outlet guide vanes 338 in FIG. 4) extending between a nacelle 306 and a tail cone 340 of the BLI fan 300. Specifically, for the embodiment of FIG. 10, the nacelle 306 is supported solely through one or more structural members 308 positioned forward of a plurality of fan blades 310 of a fan 304 in a cantilevered fashion. With such a configuration, the tail cone 340 of the BLI fan 300 can be attached to a fan shaft 312 of the fan 304 of the BLI fan 300, such that the tail cone 340 is also rotatable about the axial centerline 302 of the BLI fan 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having a fuselage, the propulsion system comprising:
    an aft engine configured to be mounted to the aircraft at an aft end of the aircraft, the aft engine defining a central axis and including
        a fan rotatable about the central axis of the aft engine and including a plurality of fan blades;
        a nacelle encircling the plurality of fan blades of the fan and extending around the mean line of the aircraft at the aft end of the aircraft when the aft engine is mounted to the aircraft; and
        one or more structural members extending between the nacelle and the fuselage of the aircraft at a location forward of the plurality of fan blades when the aft engine is mounted to the aircraft,
        wherein the fan of the aft engine includes a fan shaft and a tail cone, wherein fan shaft is rotatable about the axial centerline of the aft engine, and wherein the tail cone is attached to the fan shaft such that the tail cone is also rotatable about the axial centerline of the aft engine.

2. The propulsion system of claim 1, wherein the aft engine is configured as a boundary layer ingestion fan.

3. The propulsion system of claim 1, wherein the aft engine further includes a tail cone and one or more outlet guide vanes, wherein the one or more outlet guide vanes extend from the nacelle to the tail cone.

4. The propulsion system of claim 1, wherein the fan of the aft engine is configured as a variable pitch fan.

5. The propulsion system of claim 1, wherein the nacelle defines an inlet extending substantially 360 degrees around the mean line of the aircraft when the aft engine is mounted to the aircraft.

6. The propulsion system of claim 1, wherein the aft engine defines a circumferential direction, and wherein the one or more structural members include a plurality of structural members spaced along the circumferential direction of the aft engine.

7. The propulsion system of claim 1, wherein the aft engine defines a radial direction, and wherein the one or more structural members include a plurality of structural members extending substantially along the radial direction of the aft engine.

8. The propulsion system of claim 1, wherein the one or more structural members are configured as inlet guide vanes.

9. The propulsion system of claim 1, wherein the one or more structural members are configured as variable inlet guide vanes.

10. The propulsion system of claim 1, wherein the one or more structural members include at least one of stabilizer of the aircraft.

11. The propulsion system of claim 1, wherein the aft engine defines an axial direction, and wherein the one or more structural members define an angle with the axial direction between about zero degrees and about ninety degrees.

12. The propulsion system of claim 1, wherein the aft engine is configured to be mounted to an aircraft having a pair of wings, and wherein the propulsion system further includes two or more aircraft engines, each of which mounted to one of the pair of wings of the aircraft.

13. A boundary layer ingestion fan for mounting to an aircraft at an aft end of the aircraft, the boundary layer ingestion fan comprising:
    a fan rotatable about a central axis of the boundary layer ingestion fan and including a plurality of fan blades;
    a nacelle encircling the plurality of fan blades of the fan and defining an inlet with the fuselage of the aircraft, the inlet extending substantially around the fuselage of the aircraft when the boundary layer ingestion fan is mounted at the aft end of the aircraft; and
    one or more structural members attached to the nacelle at a location forward of the plurality of fan blades of the fan for mounting the boundary layer ingestion fan to the aircraft,
    wherein the fan of the aft engine includes a fan shaft, wherein the fan shaft is mechanically coupled, through a gearbox, to a power source located forward of the plurality of fan blades of the fan.

14. The boundary layer ingestion fan of claim 13, wherein the boundary layer ingestion fan defines a circumferential direction, and wherein the one or more structural members include a plurality of structural members spaced along the circumferential direction of the boundary layer ingestion fan.

15. The boundary layer ingestion fan of claim 13, wherein the boundary layer ingestion fan defines a radial direction, and wherein the one or more structural members include a plurality of structural members extending substantially along the radial direction of the boundary layer ingestion fan.

16. The boundary layer ingestion fan of claim 13, wherein the one or more structural members are configured as inlet guide vanes.

17. The boundary layer ingestion fan of claim 13, wherein the boundary layer ingestion fan further includes a tail cone and one or more outlet guide vanes, wherein the one or more outlet guide vanes extend from the nacelle to the tail cone.

* * * * *